(12) United States Patent
Williams

(10) Patent No.: US 7,923,946 B2
(45) Date of Patent: Apr. 12, 2011

(54) FLYWHEEL-BASED ENERGY STORAGE ON A HEAVE-COMPENSATING DRAWWORKS

(76) Inventor: Kevin R. Williams, Cypress, TX (US)

( * ) Notice: Subject to any disclaimer, the term of this patent is extended or adjusted under 35 U.S.C. 154(b) by 0 days.

(21) Appl. No.: 12/553,042

(22) Filed: Sep. 2, 2009

(65) Prior Publication Data

US 2010/0314168 A1 Dec. 16, 2010

Related U.S. Application Data

(62) Division of application No. 11/750,837, filed on May 18, 2007, now Pat. No. 7,633,248.

(51) Int. Cl.
*H02K 7/02* (2006.01)
(52) U.S. Cl. ........................... 318/150; 318/161
(58) Field of Classification Search .................. 318/140, 318/150, 161; 187/289–297
See application file for complete search history.

(56) References Cited

U.S. PATENT DOCUMENTS

| 5,712,456 | A | 1/1998 | McCarthy et al. | |
| 5,936,375 | A * | 8/1999 | Enoki | 318/727 |
| 6,043,577 | A | 3/2000 | Bornemann et al. | |
| 6,172,435 | B1 | 1/2001 | Tanaka | |
| 6,236,127 | B1 | 5/2001 | Bornemann | |
| 6,365,981 | B1 | 4/2002 | Tokita | |
| 6,819,012 | B1 | 11/2004 | Gabrys | |
| 7,078,880 | B2 | 7/2006 | Potter et al. | |
| 7,228,942 | B2 * | 6/2007 | Takehara et al. | 187/290 |
| 7,294,080 | B2 * | 11/2007 | Hoshino | 475/149 |
| 2005/0173197 | A1 * | 8/2005 | Takehara et al. | 187/277 |
| 2008/0203734 | A1 * | 8/2008 | Grimes et al. | 290/40 R |

FOREIGN PATENT DOCUMENTS

WO  WO 87/ 07587  *  6/1987

* cited by examiner

*Primary Examiner* — Bentsu Ro
(74) *Attorney, Agent, or Firm* — Egbert Law Offices PLLC

(57) ABSTRACT

A system for managing energy consumption in a heave-compensating drawworks includes a power supply, a winch drum connected to the power supply so as to receive power from the power supply, a flywheel connected to the winch drum and to the power supply, and a controller connected to the power supply and to the winch drum for passing energy to and from the flywheel during an operation of the winch drum. The flywheel includes a disk rotatably coupled to an AC motor. The power supply includes a first pair of AC motors operatively connected on one side of the winch drum and a second pair of AC motors operatively connected on an opposite side of the winch drum.

7 Claims, 4 Drawing Sheets

FLYWHEEL-BASED ENERGY STORAGE ON A HEAVE-COMPENSATING DRAWWORKS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to offshore drilling activities. More particularly, the present invention relates to offshore drawworks that include heave compensators so as to cause the drill string to move in relation to the heave of the vessel upon which the drawworks is located. Additionally, the present invention relates to flywheels that can be used for energy storage and used, in particular, in association with the cyclic loads.

2. Description of Related Art Including Information Disclosed Under 37 CFR 1.97 and 37 CFR 1.98

There are many systems in current use that have a high power consumption cycle and a low power consumption cycle. These systems can include cranes, drag lines, oil well derricks, swell compensators, hopper arm gimbals and drag head controls. Quite often, in the oil production industry and in mining operations, it is quite common to require high power and energy consumption during certain portions of the operating cycle and low power consumption during another part of the operating cycle of the system. As an example, a crane used in either offshore operations or in mining operations will require very little power to the motor of the crane during the lowering of the bucket of the crane. In contrast, a great deal of power is required by the motor in order to lift a loaded bucket from a lower position to a higher position.

Conventionally, in such cyclic operations, it is necessary to size the power supply so as to accommodate the maximum expected power consumption during the high energy consumption cycle of the operation. During the cyclic loads, the power supply will continually cycle between the delivery of maximum power and the delivery of minimum power. It has been found that the cyclic loads on the power supply causes a disproportionately large amount of fuel consumption and, accordingly, adverse environmental impacts.

One particular type of cyclic operation occurs in heave-compensation drawworks. Typically, these heave-compensation drawworks will be placed upon a drilling ship. The drilling ship is utilized so as to drill for oil and gas in offshore operations. In these drilling ships, the drill string will extend through a floor of the ship and be supported by a wire rope connected to a sheave system. A winch drum is connected to an end of the wire rope so as to pay out and pay in the drill string relative to the wave action affecting the drilling ship. Since it is important to maintain proper weight-on-bit during the drilling operation, the heave-compensation system is relatively complex. For example, when there is an upward heave of the drilling ship, the winch drum should pay out the wire rope so as to maintain the drill string in a proper location below the ship and to maintain proper weight-on-bit. On the other hand, when there is a downward movement of the ship, for example, by a trough of the waves, then the winch drum will pay in the wire rope so as to prevent the drawworks from exceeding the proper weight-on-bit from the downward force caused by the downwardly moving drill ship. Typically, on these heave-compensation drawworks, the motors that are associated with the winch drum and the drawworks can only lower the drill string at a maximum predetermined rate. Preferably, the drill string should be lowered as quickly as possible. However, because of the inertia associated with each of the motors of the drawworks, the motors must be controlled so as to prevent the maximum rate of downward movement of the drill string. As such, energy consuming actions, such as the application of braking forces, are placed upon the motors associated with the winch drum even during relatively non-energy consuming activities, such as the lowering of the drill string.

When the drill string is being raised for various purposes, the motors must exert sufficient power so as to elevate the drill string at a desired rate. In certain circumstances, the drill string must be lifted so as to allow for the replacement of the bit. This requires a great deal of energy consumption since the entire weight of the drill string must be lifted. As such, the motor requirements for the drilling ship are particularly high since the motors must be sized so as to be able to lift a great deal of weight associated with the drill string. A problem is that when large motors are used for the lifting of the drill string, greater braking capacity is required since large motors will have greater inertia during the lowering of the drill string.

In the past, DC motors have been used for the paying in and out of the wire rope on such heave-compensation drawworks. These DC motors typically will require a transmission so as to carry out the proper raising and lowering activities. The DC motor is clutched out during the paying out of the wire rope. A friction-type brake is utilized so as to prevent excess speed and to prevent excess inertia of the DC motor. These friction-type brakes have included, in the past, eddy-current brakes and disk brakes. Typically, the eddy-current brake is attached to the drive of the drawworks. Whenever disk brakes are used, they will tend to wear out over time.

Recently, AC motors have been incorporated into drilling ships for the purposes of controlling the drawworks and for the operation of the winch drum. These AC motors offer the benefit of greater torque and a fixed gearbox ratio. These AC motors do not require clutches. However, they will have a restricted pay out speed. Typically, the AC motor itself is used for the braking of the motor inertia. In the past, dynamic braking resistors have been employed with the use of the AC motors so as to capture some of the braking energy.

Unfortunately, these dynamic braking resistors accumulate excess energy which needs to be burned off. In offshore facilities, this excess energy is often used for the hotel load of the facility. However, offshore operators often struggle to find extra utilities to burn off the excess energy. In the past, it has been found that this excess energy from the dynamic braking resistors can be applied to the thrusters associated with the drilling ship. In particular, the engines associated with the thrusters are powered and operated by this excess energy. When the excess energy becomes too great, then drill ship operators will often point the thrusters at each other so as to maintain a stable position in the water while burning the excess energy. Unfortunately, the use of the energy in this manner will tend to quickly burn out the engines associated with the thruster and possibly compromise the DP 2 classification of the offshore system. In offshore facilities, such as drilling ships, the loss of the DP 2 classification is critical to the offshore operator. In the event that the ship does not have the ability to properly control its position relative to the bore hole, then there can be severe repercussions associated with the loss of position. As such, all drilling ships must maintain the redundant capability of its engines and the ability to maintain position within the water.

In the past, various flywheel systems have been utilized for the control of energy loads. U.S. Pat. No. 5,712,456, issued on Jan. 27, 1998 to McCarthy et al., describes a flywheel energy storage system for operating elevators. The elevator system, having a three-phase rectifier which converts energy to a three-phase AC main to provide DC power on a bus to a three-phase inverter that drives a three-phase inductive hoist motor, utilizes the generated energy applied to a boost regulator to drive a flywheel motor generator to store the regenerated energy in the form of inertia therein. When the flywheel motor generator reaches a limiting speed, any continued regenerated energy is dumped in an energy dissipating device. During periods of high demand, the inertial energy stored in the flywheel generator is used to add energy to the DC bus to provide additional current to the three-phase inverter for driving the hoist motor. The control is provided by software embedded in a elevator computer.

U.S. Pat. No. 6,043,577, issued on Mar. 28, 2000 to Bornemann et al., describes a flywheel energy accumulator having a vertical shaft rotatably supported in a vacuum housing by superconductive magnetic axial support bearings. Lower and upper flywheels are mounted on the shaft in axially spaced relationship. A homopolar dynamic machine with a rotating magnetic field is disposed in the space between the flywheels and includes a stator supported in, or forming part of, the housing. A rotor is mounted on the shaft.

U.S. Pat. No. 6,172,435, issued Jan. 9, 2001 to J. Tanaka, teaches a flywheel power source device for converting electric energy into kinetic energy and for storing the kinetic energy by rotating a flywheel. The flywheel is supported by a rotary shaft that is rotatably mounted in a bearing in a casing. The kinetic energy is reconverted into electric energy when necessary.

U.S. Pat. No. 6,236,127, issued on May 22, 2001 to Bornemann, describes another type of flywheel energy accumulator that has a vertical shaft with the rotor of an electric motor/generator in a vacuum-type housing. Flywheels are mounted on the shaft at opposite sides of the rotor. The electric motor/generator and the flywheels are placed in modules which are mounted on top of one another.

U.S. Pat. No. 6,365,981, issued on Apr. 2, 2002 to M. Tokita, provides a power generation system with a flywheel apparatus. The flywheel apparatus has a frame, a flywheel section and an exciting section. The flywheel section has an input unit having the input shaft, first and second flywheel units having the output shaft, and first and second drive units for transmitting the rotary force of the input unit to the first and second flywheel units. The exciting section increases the flywheel effect of the flywheel section.

U.S. Pat. No. 6,819,012, issued on Nov. 16, 2004 to C. W. Gabrys, discloses a flywheel energy storage system that has an energy storage flywheel supported in a low pressure containment vessel for rotation on a bearing system. A brushless motor/generator is coupled to the flywheel for accelerating and decelerating the flywheel for storing and retrieving energy. The flywheel is rotated in normal operation at a speed such that the generator voltage is higher than the output voltage. Power supplied to the load from the generator is a regulated output that is maintained at a substantially constant voltage level by using switching regulation of the alternating current voltage generated by the generator. The switching regulation of each generator phase occurs at a frequency equal to or less than twice the frequency of the generator alternating current. As so operated, the flywheel uninterruptible power supply efficiently maintains power to an electrical load during an interruption of primary power by supplying power generated from the flywheel generator.

U.S. Pat. No. 7,078,880, issued on Jul. 18, 2006 to Potter et al., provides an energy storage flywheel voltage regulation and load sharing system. This system for regulating the voltage in an electrical distribution system includes a plurality of flywheels, motor/generators, and controllers. Each of the motor/generators is coupled to one of the energy storage flywheels and to the electrical supply system. The motor/generators each supply one or more signals representative of motor/generator operational parameters, and each motor/generator controllers receive one or more of the motor/generator operational parameter signals from each of the motor/generators. In response to the operational parameter signals, the motor/generator controllers each control the operation of one of the motor/generators in either a motor mode or a generator mode. This regulates the electrical supply system voltage and equally shares the electrical load between the motor/generators.

It is an object of the present invention to provide an energy storage system on a heave-compensation drawworks that effectively stores, absorbs and relinquishes energy.

It is a further object of the present invention to provide an energy storage system on a heave-compensation drawworks that eliminates the need for transmissions.

It is a further object of the present invention to provide an energy storage system on a heave-compensation drawworks that decreases power consumption requirements.

It is still another object of the present invention to provide an energy storage system on a heave-compensation drawworks that achieves a relatively constant load profile free of peaks and valleys from the power source.

It is another object of the present invention to provide an energy storage system on a heave-compensation drawworks which achieves the fastest drop speed possible.

It is another object of the present invention to provide an energy storage system on a heave-compensation drawworks which avoids the need for brakes.

It is still a further object of the present invention to provide an energy storage system for use on a heave-compensation drawworks that maximizes fuel savings while minimizing emissions.

It is still a further object of the present invention to provide an energy storage system on a heave-compensation drawworks that extends engine life.

It is still another object of the present invention to provide an energy storage system on a heave-compensation drawworks that avoids the use of batteries and dynamic braking resistors.

These and other objects and advantages of the present invention will become apparent from a reading of the attached specification and appended claims.

BRIEF SUMMARY OF THE INVENTION

The present invention is a system for managing energy consumption in a heave-compensation drawworks. This invention comprises a power supply, a winch drum connected to the power supply so as to receive power from the power supply, a flywheel connected to the winch drum and to the power supply, and a control means connected to the power supply and to the winch drum for passing energy to and from the flywheel during an operation of the winch drum.

In the present invention, the flywheel includes a disk coupled rotatably to an AC motor. In particular, in the preferred embodiment, the flywheel has a first AC motor and a second AC motor facing the first AC motor. The disk is positioned between the first and second AC motors.

The power supply of the present invention is an AC motor mounted on one side of the winch drum. In the preferred embodiment of the present invention, this power supply includes a first pair of AC motors operatively connected on one side of the winch drum and a second pair of AC motors operatively connected on an opposite side of the winch drum. The first and second pairs of AC motors can be coupled to the flywheel by a common shaft. In the preferred embodiment of the present invention, the AC motor is a dual stator induction motor.

The system of the present invention includes a wire rope wound around the winch drum, a sheave receiving the wire rope thereover, and a hook load affixed to the end of the wire rope opposite the winch drum and below the sheave. The wire rope extends and retracts relative to a rotation of the winch drum. The equipment of the present invention can be placed upon a drilling ship having the power supply, the winch drum, the flywheel, and the control means positioned thereon. A gear reduction can be interposed between the power supply and the winch drum.

The present invention is also a process of managing energy consumption in a heave-compensation drawworks. This process includes the steps of: (1) rotating the winch drum so as to pay out the wire rope and to lower the drill string downwardly; (2) transferring the energy from the lowered drill string to a flywheel so as to rotate the flywheel; and (3) transferring energy from the rotating flywheel to another location on the drawworks.

The step of transferring energy from the rotating flywheel includes transferring energy from the rotating flywheel to the winch drum and raising the drill string by paying in the wire rope over the winch drum. An AC motor is connected to the winch drum so as to apply rotational forces to the winch drum. There is another AC motor connected to the flywheel.

The step of transferring energy from the lowered drill string includes transferring energy from the AC motor connected to the winch drum to another AC motor connected to the flywheel. In the process of the present invention, the process is used for compensating for heave of the drawworks by rotating the winch drum in relation to a movement of the drawworks in response to wave motion. The step of connecting an AC motor includes coupling the winch drum to a first AC motor by a shaft on one side of the winch drum and coupling the winch drum to a second AC motor by the same shaft on an opposite side of the winch drum. The heave is compensated by moving the sheave assembly vertically in relation to a movement of the drawworks in response to wave motion.

DETAILED DESCRIPTION OF THE INVENTION

Figure 1:
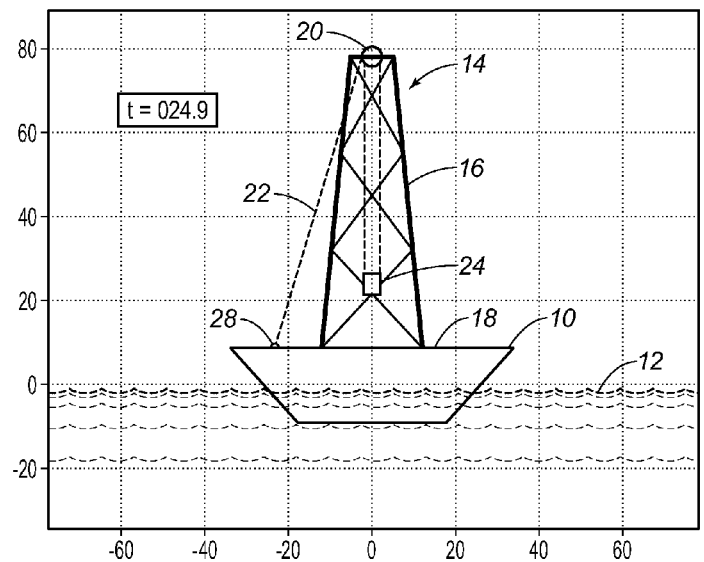
FIG. 1 is a diagrammatic illustration of the system and process of the present invention.

Referring to FIG. 1, there is shown a drilling ship 10 as illustrated as floating on a body of water 12. The drilling ship 10 is utilized in association with heave-compensating drawworks 14. As can be seen, a derrick 16 extends upwardly from the deck 18 of ship 10. A sheave assembly 20 is positioned at the top of the derrick 16. The sheave assembly 20 supports a wire rope 22 extending thereover. Wire rope 22 extends downwardly so as to support a hook load 24 at an end of the wire rope 22. The hook load 24 is configured so as to support the drill string 26. It can be seen that the drill string 26 extends to the floor 18 of the ship 10 and downwardly through the body of water 12. Ultimately, the drill string 26 will have a bit on the end opposite the hook load 24 which is used for the drilling activities. It is important to note that the weight supported by the hook load 24 and by the wire rope 22 is extremely heavy. A winch drum 28 is connected to the opposite end of the wire rope 22 and supported on the deck 18 of the ship 10. The winch drum 28 is used for paying in and paying out the wire rope 22 in relation to the desired movement of the drill string 26 or the desired weight-on-bit at the end of the drill string 26.

Since the water 12 will have wave action thereon, the ship 10 will tend to follow this wave action and heave upwardly and downwardly. Since it is desired to maintain a relatively constant weight-on-bit in association with the drilling activities of the drill string 26, the sheave assembly 20 and the associated wire rope 22 will need to raise and lower in relation to the wave motion of the water 12. When a wave is encountered and a ship elevates by reaching the crest of the wave, then the sheave assembly 20 and the associated wire rope 22 should be payed out by the winch drum 28 so as to maintain the drill string 26 at a constant position. On the other hand, when the ship 10 encounters a trough of the wave of water 12, it will be necessary for the winch drum 28 to rotate to draw in the wire rope 22 and to raise the sheave assembly 20 in order to maintain this proper position of the drill string 26. The hook load 24 can also be used for the lowering of the drill string 26 prior to drilling. Under these circumstances, the winch drum 28 will pay out the wire rope 22 so as to properly lower the hook load 24 for the purposes of lowering the drill string 26 to a desired underwater location.

In the prior art, when the drill string 26 is lowered to its underwater location, the winch drum 28 would need to be braked so as to prevent undesired inertia. As such, the maximum speed of lowering of the drill string 26 was precisely controlled. It was not possible to achieve the maximum lowering rate because of the concern for the motor inertia and the need for braking.

Figure 2:
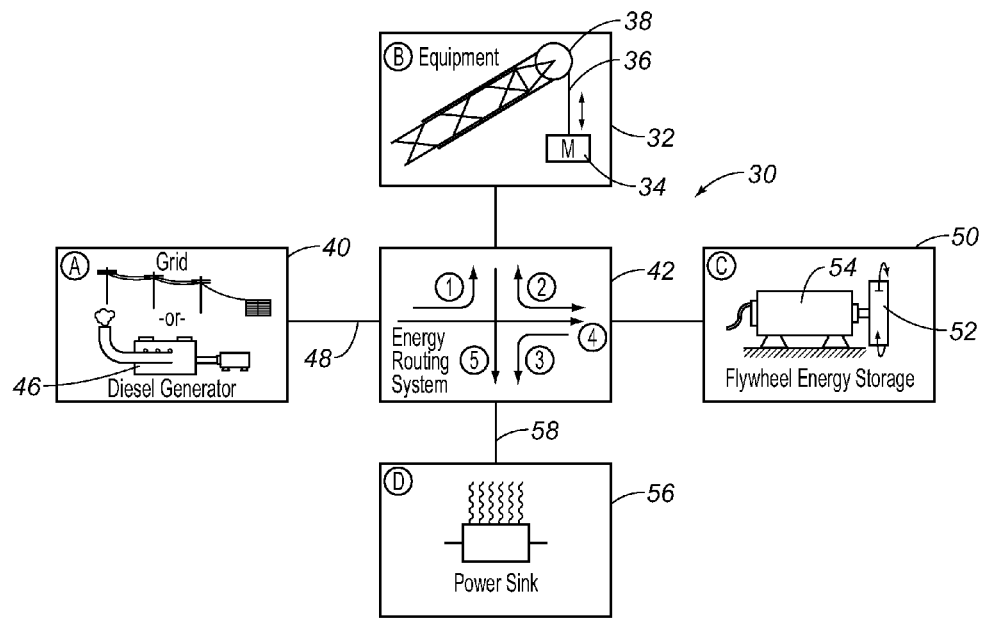
FIG. 2 is a block diagram showing the processing of energy in accordance with the present invention.

FIG. 2 illustrates the energy control system 30 in accordance with the teachings of the present invention. There is shown in block 32 that the hook load 34 is supported on a wire rope 36 extending from sheave 38. A power supply 40 provides energy for the controller 42. The power supply 40 can be a utility grid 44 or an AC motor 46. Power is delivered from the power supply 40 along line 48 to the controller 42. Controller 42 is also connected to a flywheel energy storage system 50. The flywheel energy storage system includes a flywheel 52 and an AC motor 54. A power sink 56 is connected by line 58 to the controller 42. Power sink 56 can be in the nature of batteries at another location on the drawworks. The controller 42 includes a suitable algorithm so as to direct energy to and from the various blocks 32, 40, 50 and 56 in relation to the power demands of the heave-compensation drawworks.

Figure 3:
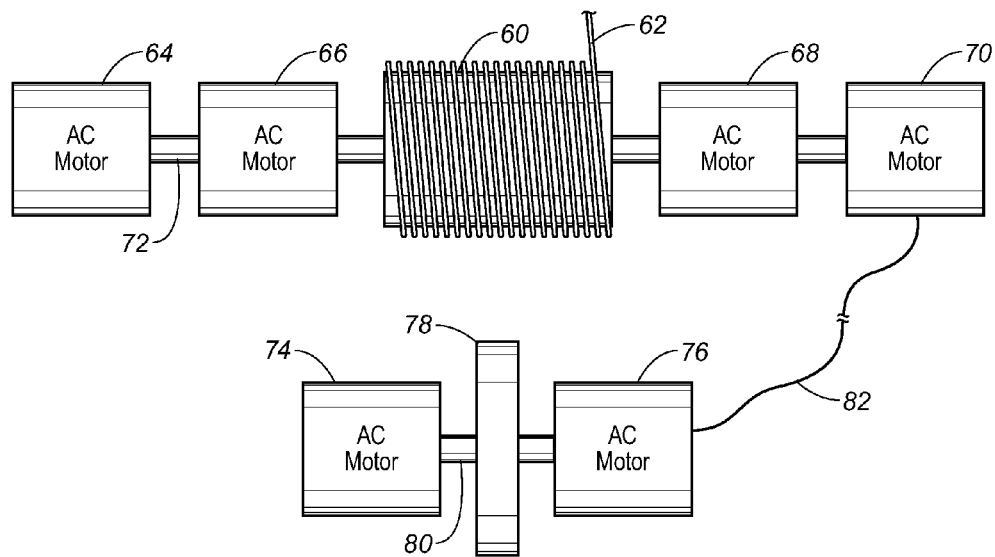
FIG. 3 is an illustration showing the use of the AC motors in association with the winch drum and the flywheel.

FIG. 3 is an illustration of the operation of the flywheel and winch drum of the present invention. Initially, it can be seen that the winch drum 60 has wire rope 62 wound therearound. The winch drum 60 is controllably connected to AC motors 64, 66, 68 and 70. A common shaft 72 will extend between the AC motors 64, 66, 68 and 70 and be connected to the winch drum 60. As such, the AC motors 64, 66, 68 and 70 can deliver the requisite power for the rotation of the winch drum 60 in accordance with the requirements of the heave-compensating drawworks. The power of the AC motors 64, 66, 68 and 70 can be delivered by line 82 (or any other conduit) to the AC motors 74 and 76 associated with a flywheel 78. A common shaft 80 joins the AC motors 74 and 76 to the flywheel 78. The flywheel 78 is in the nature of a steel disk or a disk assembly. As used herein, the flywheel 78 can also be incorporated onto common shaft 72 in any position between any of the AC motors 64, 66, 68 and 70 within the concept of the present invention.

In experiments conducted with the present invention, it is found that the present invention achieved many advantages over the prior art. The energy storage system of the present invention is particularly adapted for use with the drawworks-based heave-compensation of a deep-sea drilling vessel. This is because there are highly predictable and period characteristics of ocean swells that readily allow for highly efficient energy recovery. As such, the present invention eliminates the need for wasteful dissipation schemes.

Studies of the present invention are based upon an actual drawworks (HITECH AHC-1000) a one-thousand ton drawworks, in operation on a drill ship. The system that was analyzed includes the AC motors 64, 66, 68 and 70 with suitable gear reductions, the winch drum 60 and the winding mechanics, the wire rope 62, the sheave assembly 20 and the hook load 24. The systems are separately modeled and coupled via force balances.

The HITEC AHC-1000 drawworks uses six GEB22 AC induction motors. They convert electrical power into a mechanical torque directly applied to a rotating inertia (the rotor) at a constant efficiency of 95%. The motors and drives are able to fully regenerate power at an efficiency of approximately 95%. The motors are speed-controlled via PID controllers. The outputs are limited by speed-torque characteristics and major drive parameters (slew rate, speed limits, etc.). Due to the periodic nature of heave compensation, the motors are allowed run at 140% load while heave compensating.

In particular, dual-stator AC motors are used as the AC motors associated with the winch drum. These motors are large, low speed, very high torque machines that are directly coupled to the winch drum. As such, it eliminates the necessity for a gear reduction. The rotor is ring-shaped and has a concentric outer stator and inner stator. The outer stator delivers 68% of the total torque, while the inner stator delivers the remaining 32%.

The drawworks requires four such dual-stator AC motors, such as motors 64, 66, 68 and 70. Motors 64 and 66 are located on one side of drum 60 while the motors 68 and 78 are located on the opposite side of drum 60. These motors 64, 66, 68 and 70 are coupled to each other by a common shaft 72. Since rotational inertia on the high speed side of a gear reduction is effectively multiplied by the square of the gear ratio, this direct drive setup will have a significantly lower total inertia (approximately 35% lower than the GEB22 equipped system) while the overall weight stays roughly the same. This system will also benefit from the elimination of gear backlash, greater redundancy, a lower cost drive system, and high breakdown torque (225% of nominal).

The torque characteristics of the HITEC AHC-1000 ton drawworks is shown here below in Table 1:

TABLE 1

| | Symbol | Value | Unit |
|---|---|---|---|
| Drawworks specs | | | |
| Gear ratio | GR | 10.5 | |
| Number of line parts | N | 14 | |
| Drum radius | R | 1.867 | M |
| Drum length | L | 2.057 | M |
| Drum inertia | $I_d$ | 12000 | kg·m² |
| Wire rope diameter | 2Rear wheel | 50.8 | Mm |
| Wire rope elastic modulus | E | 90 | GPa |
| GEB22 AC induction motor | | | |
| Nominal speed | | 800 | RPM |
| Continuous torque | $T_c$ | 10,260 | N.m |
| Continuous power | $P_c$ | 858 | kW |
| Intermittent overload capacity | | 140 | % |
| Intermittent torque | Tj | 14,364 | N.m |
| Intermittent power | $P_i$ | 1,201 | kW |
| Inertia | Im | 18.2 | kg·m² |
| Number of motors | Nm | 6 | |

The direct drive drawworks of the preferred embodiment of the present invention is particularly described in Table 2 hereinbelow:

TABLE 2

| | Symbol | Value | Unit |
|---|---|---|---|
| Drawworks specs | | | |
| Gear ratio | GR | 1 | (direct drive) |
| Number of line parts | N | 14 | |
| Drum radius | R | 1.867 | M |
| Drum length | L | 2.057 | M |
| Drum inertia | $I_d$ | 12000 | kg·m² |
| Wire rope diameter | 2.Rw | 50.8 | Mm |
| Wire rope elastic modulus | E | 90 | GPa |
| High torque/dual stator AC induction motor | | | |
| Nominal speed | | 98 | RPM |
| Continuous torque | $T_c$ | 155,900 | N.m |
| Continuous power | $P_c$ | 1600 | kW |
| Intermittent overload capacity | | 150 | % (conservative rating) |
| Intermittent torque | $T_i$ | 233,900 | N.m |
| Intermittent power | $P_j$ | 2400 | kW |
| Inertia | $I_m$ | 1950 | kg·m² |
| Number of motors | $N_m$ | 4 | |

For proper sizing of the flywheel 78, an estimate should be made of the drawworks' peak power draw and energy fluctuation. It is proper to consider the potential (block height relative to ship deck) and kinetic (rotation of drum and motor) energy contained in the drawworks system. This is calculated in accordance with the following formulas:

$$E = \frac{1}{2}I_t\dot{\theta}^2 - MgH(t)$$

where $$\dot{\theta} = \frac{N}{R}\frac{dH(t)}{dt},$$

$$H(t) = A\sin\left(\frac{2\pi}{P}t\right),$$

$$I_t = I_m GR^2 + I_d$$

In this approximation, the hook is assumed to be held absolutely motionless while the ship heaves sinusoidally with heave height H(t). Energy is contained as potential energy in the relative hook height and as kinetic energy in the rotating motors and winch drum. Drum speed is assumed to be exactly proportional with heave speed, with a factor based on the number of line parts N and drum radius R. The total effective $\dot{\theta}$ inertia $I_t$ stems from the drum inertia plus the total effective inertia of the motors as seen through a reduction of gear ratio GR. Using the following equations, the absolute minimum and maximum of E(t), and the total (peak-to-peak) energy fluctuation as shown herein below:

$$\Delta E = 2C_2 \text{ if } C_2 > 2C_1$$

$$\Delta E = C_1 + \frac{C_2^2}{4C_1} + C_2 \text{ if } C_2 \leq 2C_1$$

where $$C_1 = \frac{2\pi^2 N^2 A^2 I_t}{R^2 P^2}$$

$$C_2 = MgA$$

Using these equations, and taking the torque and power limits into account, an estimate can be made as to the maximum energy fluctuations. Since the energy fluctuation can become arbitrarily large with increasing heave period (allowing high amplitude, but low-speed heaving motion), an upper limit to the heave period must be set. This limit is chosen as 18 seconds, corresponding to the maximum considered in the HITEC AHC-1000 specification. For an 18 second period, the maximum energy fluctuation will be about 41 MJ. By using 6 motors at 140% capacity and 95% efficiency, the maximum power draw will be approximately 7600 KW.

The flywheel system 78 is a very simple system. It is a simple torque device (an AC induction motor/generator coupled to a large rotational inertia). The governing equation is:

$$T = I\dot{\omega} + T_d$$

where T is shaft torque, $T_d$ is aerodynamic drag torque, I is the rotational inertia and $\omega$ denotes the time derivative of angular velocity. The total amount of kinetic energy contained in the rotating mass is:

$$E = \frac{1}{2}I\omega^2$$

and the power transfer at the time is derivative of this. The aerodynamic drag of the spinning flywheel is estimated by considering the shear drag on a flat plate, aligned parallel to a fluid stream:

$$F_{plate} = \frac{1}{2}C_{Df}\rho A V^2$$

where $F_{plate}$ is the drag force, $C_{Df}$ is the shear drag coefficient, $\rho$ is fluid density A is the reference area, and V is linear velocity. By assuming that the flywheel is cylindrical with a thickness D, the above equation is integrated over the entire surface of the flywheel. As such, the total drag torque is:

$$T_d = \int_S \int F_{plate} r \, dA = \pi\rho C_{Df}\omega^2(2/5\, r^5 + Dr^4)$$

A number of empirical formulas already exist to determine the drag coefficient. In the present case, the following formula for turbulent flow is used:

$$C_{Df} = \frac{0.455}{(\log(Re))^{2.58}}$$

where the Reynolds number $R_e$ is based on the flywheel radius and tip speed. The specifications of the flywheel are identified hereinbelow in Table 3:

TABLE 3

| Motor/aenerator (2 per flywheel) | | |
|---|---|---|
| Nominal speed | 800 | RPM |
| Nominal power | 746 | kW |
| Intermittent power | 1,201 | kW |
| Flywheel | | |
| Diameter | 1.9 | m |
| Thickness | 0.20 | m |
| Inertia | 2000 | kg·m² |
| Weight | 4555 | kg |
| Speed range | 500-1650 | RPM |
| Energy capacity | 28 | MJ |
| Power dissipation @ max speed | 71 | kW |

The flywheel system has two main goals. First, it should store and reuse regenerated power so as to realize a lower overall average power consumption. Second, it should buffer the equipment's power requirements in such a way that the power source sees a relatively constant load profile free of extreme peaks and valleys. It is desirable to dimension the device such that its energy and power capacity is consistent with the machine's maximum estimated peak-to-peak energy fluctuations and power demand. Since it has been estimated that the energy fluctuation is estimated to be approximately 41 MJ, a flywheel capacity of roughly double that amount will ensure a sufficient energy range. The maximum power to be delivered by the flywheel is roughly equal to the maximum power rating of the equipment it will be used with. In particular, the flywheel system can consist of the same GEB22 AC motors as used in the drawworks. The flywheel will include a large steel disc. Motors 74 and 76 face each other so as to drive a flywheel 78 situated in between them. Three of these units are sufficient to provide the power and energy storage capacity required for the heave-compensating drawworks. The motors all operate in parallel.

Relative to the FIG. 2, it can be seen that there are four main power generating or consuming systems located on the drilling ship 10 and associated with the heave-compensating drawworks. The main power source, as shown in block 40, is used for power generation. The equipment, as shown in block 32, is the drawworks system. This equipment 32 can provide power consumption and energy generation or regeneration. The flywheel energy storage system, as illustrated in block 50, provides power consumption and energy generation or regeneration. Finally, there is the excess power sink, as illustrated in block 56, which provides solely power consumption. The controller 42 utilizes a flywheel control algorithm. The controller 42 will coordinate energy transfer between the systems. The controller 42 routs power to and from the blocks 32, 40, 50 and 56 according to the following priorities (in order of importance): (1) the power demand of the equipment in block 32; (2) the flywheel energy storage system 50 operating within its preset limits; (3) the power drawn from the main power source 40 is constant; (4) the flywheel energy storage system 50 contains sufficient energy to supply the next demand peak; (5) the flywheel energy storage system 50 has sufficient "headroom" to absorb the next regeneration peak; and (6) a minimal amount of power is routed to the power sink 56. There are several possible routes along which the controller 42 can transfer energy. For each route, an energy index ($I_E$) and a power index ($I_P$) is defined. The energy index is related to the flywheel charge and the power index is related to the power being demanded by the application. The amount of power to be transferred along each route is a function of these two indices. Graphically, a surface in three-dimensional space is defined for each route. The value of $I_E$ and $I_P$ can be seen as coordinates defining a point on this surface. The height of the surface at this point is then a measure of the amount of power to be transferred along that route. These surfaces are chosen so that the priorities listed above are satisfied.

As an example, there is a route for controlling the amount of power routed from the equipment 32 to the power sink 56. In this case $I_E$ and $I_P$ are directly linearly related to the flywheel charge and the power demand of the equipment 32. The associated surface has zero height almost everywhere. In other words, when power demand is negative (the drawworks is regenerating) and the flywheel is almost fully charged, the system will only begin to dissipate power through the sink 56.

The power and energy indices can be directly linearly related to the current power demand or flywheel charge, respectively, or they can be filtered in some way. For example, the power transfer is scaled by a factor obtained by passing the power demand signal of the equipment 32 through a low-pass butterworth filter with a cutoff frequency below the machine's typical operating cycle frequency. The surface is shaped so that the power is continuously routed at a fairly constant trickle from the power supply 40 to the flywheel energy storage system 50. This will occur at approximately the rate of the machine's average power consumption except for when the power demand is high and flywheel is almost depleted (i.e. where power generation resources are diverted straight to the equipment 32) and when the flywheel energy storage system 50 is near maximum charge.

Besides the main control system 42, some minor logic can be added to further optimize the system's performance. Two such additions are a grid peak limiter, which limits the maximum power draw from the grid to a preset value and a pre-charge unit which precharges the flywheel to compensate for initial filter start-up transients. The system is also easily adaptable to other applications. The most important parameters to consider are those for the low-pass filters (filter order and cut-off frequency). The power routing surfaces as developed for this system are generally suitable to most cyclical applications.

The simulations conducted with these systems were developed in and run in Simulink. This is a software package that is used in conjunction with MATLAB™. As such, it provides a graphical interface to model highly complex dynamic systems in the form of familiar block diagrams. The simulation is divided into two separate parts. First, the drawworks dynamics simulation is run for a certain amount of time This simulation outputs, among other things, the drawworks' power requirement load profile. This load profile is subsequently used as an input for the simulation of the flywheel dynamics and the flywheel control system. The mathematical nature of the drawworks dynamics simulation is different from that of the flywheel control system. The drawworks model is a "stiff" nonlinear differential equation. This means that the solution can sometimes change very abruptly on a time scale that is very short compared to the time scale of interest. For example, when a new layer forms on the winch drum 60, the velocity of the wire rope 62 changes very abruptly. As such, it needs to be calculated in simulation time steps in the order of microseconds. The flywheel control system simulation contains many logic-based components that can change their output between discrete states instantaneously. The flywheel control system is simulated using a fixed-step discrete solver.

Before the simulation is started, a parameters file is provided which includes simulation settings (solver, step time, simulation duration), drawworks parameters (inertias, geometry, speed-torque characteristics, etc.) and flywheel control system settings (power routing surfaces, filter settings, etc.). First, the drawworks simulation run and its power demand output is loaded into the flywheel simulation as an input. The most important output of the flywheel simulation is the system's total power draw. This output and others are used in the post-processing where resulting electric power draw and diesel generator set fuel consumption and emissions are calculated and plots of this data are generated.

Figure 4:
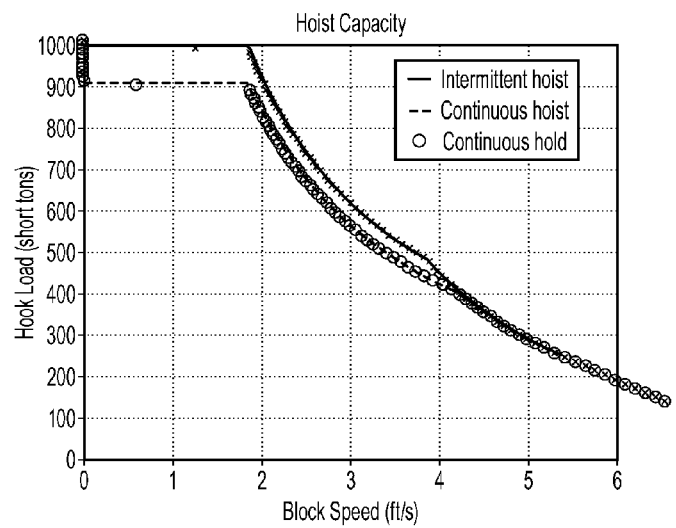
FIG. 4 is a graph showing the relationship of hoist capacity of the present invention relative to the prior art.

FIG. 4 illustrates the hoisting capacity verification. As can be seen, for an intermittent hoist the hook load can be at its maximum and will decline relative to the block speed. In other words, the amount of hook load in an intermittent hoist is reduced relative to the desired block speed. On a continuous hoist or a continuous hold, the maximum hook load is less than for the intermittent hoist and will decline at an earlier point than that for an intermittent hoist.

Figure 5:
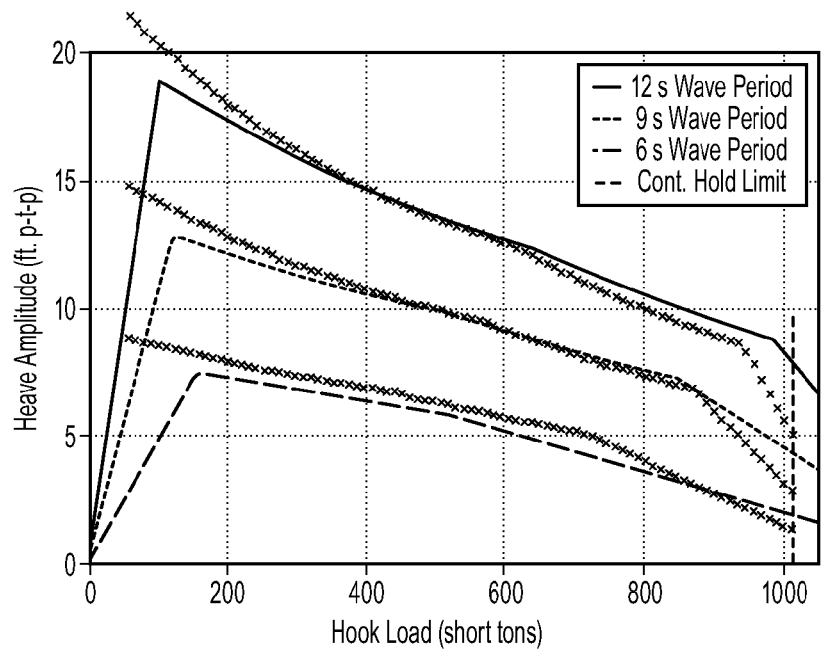
FIG. 5 is a graph illustrating heave amplitude in relation to hook load.

FIG. 5 shows the heave-compensation limits calculated through simulation and overlaid onto the scanned AHC 1000 plot. The areas where the results diverge slightly from the specifications can be attributed to differing friction factors, motor specifications and control parameters. As such, it can be seen that the hook load for the systems is rather inversely related to heave amplitude. Where the heave amplitude is great, then less hook load is possible. However, when heave amplitude is minimal, then a large hook load can be achieved.

Figure 6:
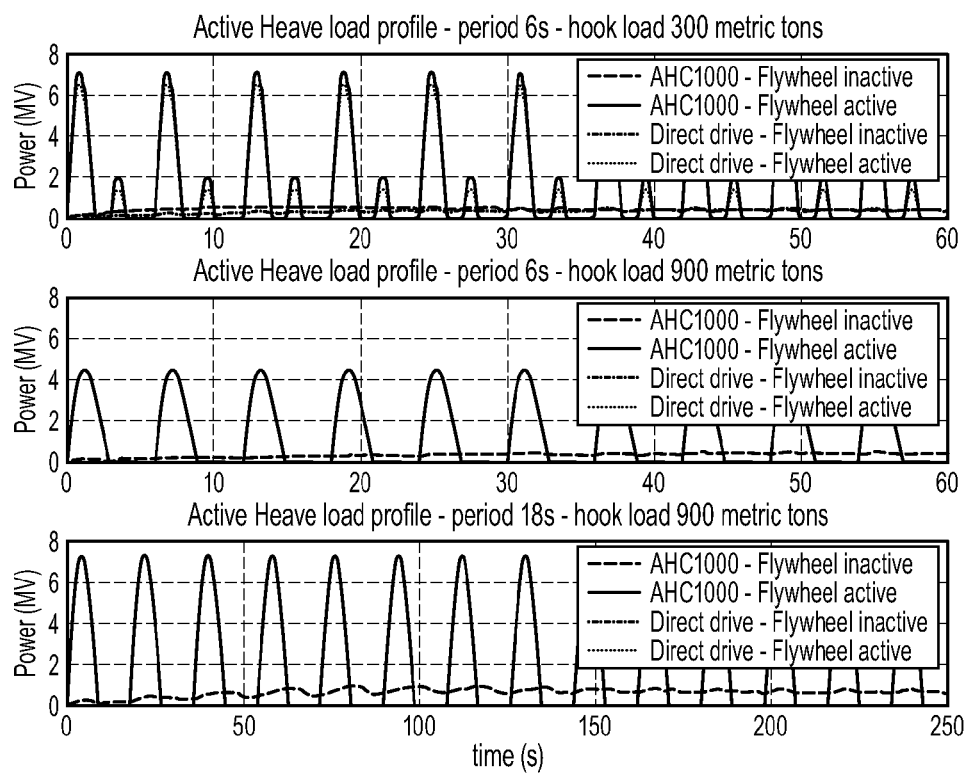
FIG. 6 is a graphical illustration of the active heave profile associated with the present invention relative to the prior art.

The simulation was run for several different limit cases for both the original HITEC AHC-1000 and direct drive configurations so as to ensure that the system performs adequately under different conditions. The overall power draw profile for the drawworks system is significantly improved when the flywheel system is implemented. This is illustrated in FIG. 6. The high peaks (which coincide with the downward heaving movement) and deep valleys (upward heave) are fully buffered by the stored energy in the flywheels. The resulting power draw profile shows only minor fluctuations. FIG. 6 illustrates the effect of the flywheel system's start-up transient. FIG. 6 plots the total external power draw of the drawworks. Initially, the flywheel's precharge is supplying most of the power to the drawworks, while external power draw slowly picks up. It can be seen that the peak load is reduced by a factor of 10 or more in most cases while average power draw is reduced approximately by a factor of 4. At low hook loads, the effect of the lower rotational inertia of the direct drive system can be seen in the load profile of FIG. 6. At higher hook loads, this effect is overshadowed by the power demanded by the linear heaving motion.

The drastic reduction in peak power draw means that power production capacity can be reduced, for example, by putting generator sets offline. As a hypothetical example, we assume that the drawworks is powered by a number of CAT 3516 1280 KW diesel generator sets. During active heave compensation operations, in four meter peak-to-peak waves, with a period of 18 seconds and a 900 ton hook load (the bottom plot in FIG. 9) six of these gensets would normally need to be online. With the energy storage system in use, only a single genset needs to be online due to the greatly reduced peak power draw.

Figure 7:
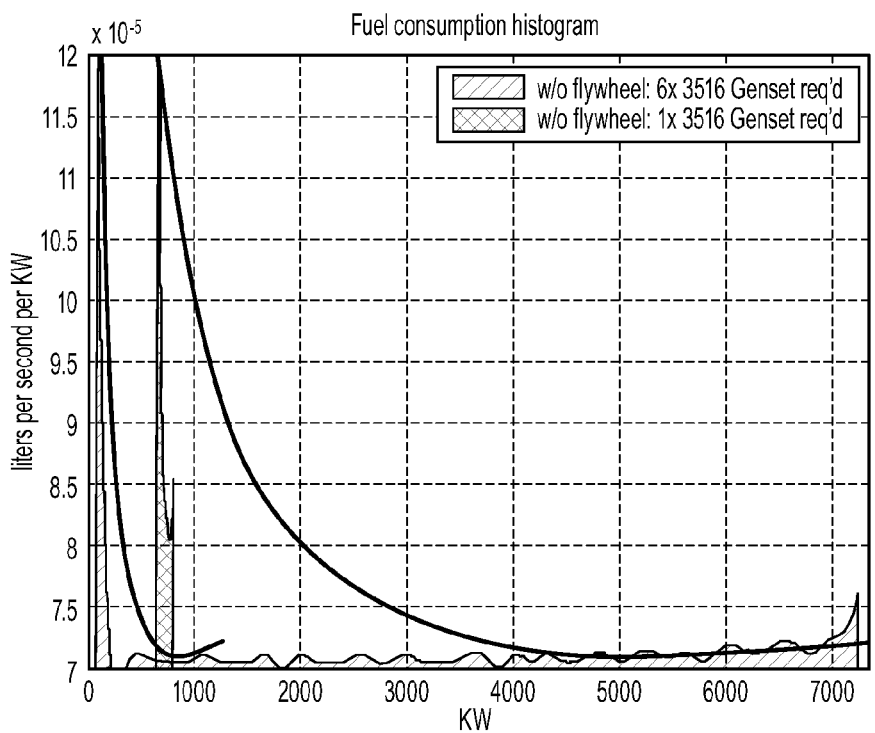
FIG. 7 is a fuel consumption histogram showing the relationship of fuel consumption by the present invention relative to the prior art.

FIG. 7 shows the fuel efficiency curves of these generator sets superimposed on histogram plots of the drawworks' power draw with and without the flywheel system. The efficiency curves show that a generator set is most efficient when operating near its maximum power rating. The histograms are a measurement of the relative amount of time that the drawworks is demanding a certain amount of power. When unaided by the flywheel device, large amounts of power (up to 7500 KW) are drawn for short periods of time, but the overall power requirement is very low. With the flywheel-equipped drawworks of the present invention, the power usage is much more consistent (approximately 700 KW). The consistent power draw and the reduced average load results in a 75% lower fuel consumption with only a single genset online instead of the usual six. The reduced fuel use and operational range of the engine/generator sets will result in significantly lower emissions.

Figure 8:
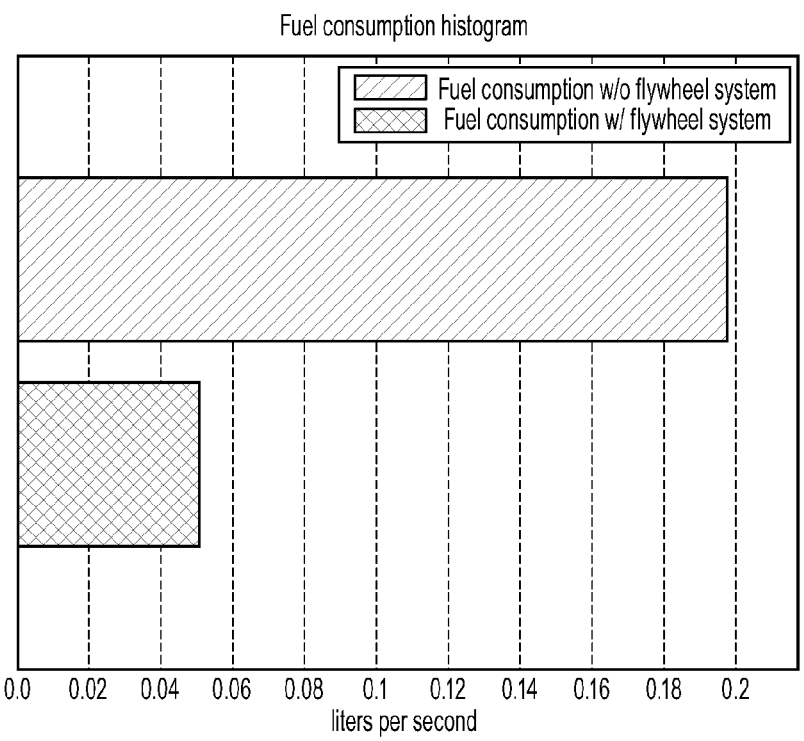
FIG. 8 is a graph showing average fuel consumption by the present invention in relation to the prior art.

As can be seen in FIG. 8, without the flywheel system of the present invention fuel consumption greatly exceeds the fuel consumption of the present invention by an order of magnitude.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A process of managing energy consumption in a drawworks, the drawworks having a winch drum with a wire rope therearound, the winch drum extending around a sheave assembly and connected to a drill string, the process comprising:
    rotating the winch drum so as to pay out the wire rope and to lower the drill string downwardly;
    transferring the energy from the lowered drill string to a flywheel so as to rotate said flywheel; and
    transferring energy from the rotating flywheel to another location on the drawworks.

2. The process of claim 1, said step of transferring energy from the rotating flywheel comprising:
    transferring energy from the rotating flywheel to the winch drum; and
    raising the drill string by paying in the wire rope over the winch drum.

3. The process of claim 1, further comprising:
    connecting an AC motor to the winch drum so as to apply rotational forces to the winch drum; and
    connecting another AC motor to the flywheel.

4. The process of claim 3, said step of transferring energy from the lowered drill string comprising:
    transferring energy from the AC motor connected to the winch drum to said another AC motor connected to the flywheel.

5. The process of claim 3, said step of connecting an AC motor comprising:
    coupling said winch drum to a first AC motor by a shaft on one side of said winch drum; and
    coupling said winch drum to a second AC motor by said shaft on an opposite side of said winch drum.

6. The process of claim 1, said another location being a utility system on the drawworks.

7. The process of claim 1, said drawworks being located on a drill ship, said another location being an engine associated with a thruster of the drill ship.

* * * * *